(12) United States Patent
Trümper et al.

(10) Patent No.: US 11,873,752 B2
(45) Date of Patent: Jan. 16, 2024

(54) EXPANSION TANK SYSTEM

(71) Applicant: Airbus Operations GmbH, Hamburg (DE)

(72) Inventors: Torsten Trümper, Hamburg (DE); Ekkehard Lohse, Buchholz (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 18/198,965

(22) Filed: May 18, 2023

(65) Prior Publication Data
US 2023/0374932 A1    Nov. 23, 2023

(30) Foreign Application Priority Data
May 20, 2022    (EP) ..................................... 22174463

(51) Int. Cl.
*F01P 11/02*    (2006.01)
*F01P 11/18*    (2006.01)

(52) U.S. Cl.
CPC ............. *F01P 11/029* (2013.01); *F01P 11/18* (2013.01); *F01P 2037/00* (2013.01)

(58) Field of Classification Search
CPC ...... F01P 11/029; F01P 11/18; F01P 2037/00; F01P 11/02
See application file for complete search history.

(56) References Cited

U.S. PATENT DOCUMENTS

| 2003/0024490 | A1* | 2/2003 | Wand | ....................... F01P 11/06 123/41.01 |
| 2011/0308484 | A1* | 12/2011 | Peterson | ................ F01P 11/029 123/41.01 |
| 2022/0042446 | A1* | 2/2022 | Rapp | .................... F01P 11/0238 |

FOREIGN PATENT DOCUMENTS

| CN | 106741978 A | 5/2017 |
| DE | 102009018012 A1 | 10/2010 |
| DE | 102019217567 A1 | 5/2021 |
| EP | 2544286 B1 | 6/2016 |

OTHER PUBLICATIONS

European Search Report for Application No. 22174463 dated Nov. 6, 2022.

* cited by examiner

*Primary Examiner* — Jacob M Amick
(74) *Attorney, Agent, or Firm* — KDW FIRM PLLC

(57) ABSTRACT

An expansion tank system for a liquid cooling system includes a first chamber for receiving a coolant, a second chamber for pressurized gas, a first gas conveying device for conveying gas from the first to the second chamber, a second gas conveying device for conveying gas from the second to the first chamber, a first pressure sensor in fluid communication with the first chamber, and a control unit connected to the first gas conveying device, the second gas conveying device and the first pressure sensor for controlling the second conveying device to selectively convey gas from the second to the first chamber if a pressure measured through the first pressure sensor is below a predefined first threshold value, and for controlling the first conveying device to convey gas from the first to the second chamber if a pressure measured through the first pressure sensor is above a second threshold value.

13 Claims, 1 Drawing Sheet

EXPANSION TANK SYSTEM

TECHNICAL FIELD

The disclosure herein relates to an expansion tank system for a liquid cooling system, a system having a heat producing device as well as a vehicle.

BACKGROUND

Cooling systems with a liquid coolant are used to cool technical devices, such as combustion engines, fuel cells and many other. Often, the coolant is supplied by a coolant source and fed to a heat exchanger in contact with the respective device so that the coolant absorbs heat. The coolant is then returned to the coolant source after passing through a suitable heat dissipation device. Due to non-uniform temperature changes of the liquid coolant, in particular when installed in a vehicle such as an aircraft that faces a broad range of ambient temperatures, density or volume changes are to be expected, which must be compensated for in a closed cooling circuit. This can be achieved, for example, by an expansion tank arranged in the cooling circuit.

Known expansion tanks comprise a container with a membrane. A part of the volume of the tank is filled with gas, which extends up to the membrane. On the other side of the membrane the liquid coolant is arranged. The gas ensures a defined minimal pressure in the cooling system and the expansion tank makes it easy to compensate for volume changes.

However, when cooling fuel cells or other sensitive devices, a maximum pressure of the coolant is limited. However, the technical implementation of such a limitation would require a large expansion tank, which is to be avoided especially in compact designs. With known expansion tanks, especially when used for fuel cells used in transportation, a maximum pressure cannot be limited and an installation space minimized at the same time.

SUMMARY

It is thus an object of the subject matter herein to disclose an alternate expansion tank, which is particularly useful for a fuel cell cooling system in an aircraft, wherein the expansion tank comprises a size and weight as low as possible and wherein the maximum pressure can be limited.

This object is met by an expansion tank system disclosed herein. Advantageous embodiments and further improvements may be gathered from the following description.

An expansion tank system for a liquid cooling system is proposed, comprising a first chamber for receiving a coolant, the first chamber having a first coolant port, a second chamber for storing a pressurized gas, a first gas conveying device connected to the first chamber and the second chamber for conveying gas from the first chamber to the second chamber, a second gas conveying device connected to the first chamber and the second chamber for conveying gas from the second chamber to the first chamber, a first pressure sensor in fluid communication with the first chamber, and a control unit connected to the first gas conveying device, the second gas conveying device and the first pressure sensor, wherein the control unit is adapted for controlling the second conveying device to selectively convey gas from the second chamber to the first chamber if a pressure measured through the first pressure sensor is below a predefined first threshold value, and for controlling the first conveying device to selectively convey gas from the first chamber to the second chamber if a pressure measured through the first pressure sensor is above a second threshold value.

The expansion tank system according to the disclosure herein thus clearly differs from common expansion tanks. The core components of the systems are the first chamber and the second chamber, which are interconnected through the first and second gas conveying devices. The first and second chamber may comprise two separate housing with a fixed volume each. However, they may be integrated into a single housing, which comprises a separation wall for separating the first chamber from the second chamber.

The first chamber is intended to receive excess coolant from a coolant circuit. For example, due to a volumetric expansion of the coolant, the coolant circuit is not capable of maintaining the total volume of the coolant inside all components of the coolant circuit, such that the excess coolant volume needs to be stored in the expansion tank system, i.e. in the first chamber. The second chamber in turn is intended for storing gas with a predetermined pressure. Pressurized gas can be selectively fed into or removed from the first chamber in order to maintain a desired pressure level therein.

Hence, instead of using a flexible, deformable membrane to separate a certain amount of pressurized gas from a coolant reservoir, the first and second gas conveying devices are used to control the pressure inside the first chamber. If the pressure inside the first chamber falls below a first threshold value, gas is fed from the second chamber into the first chamber to increase the pressure. If the pressure inside the first chamber exceeds the second threshold value, gas is removed from the first chamber and fed to the second chamber. The first gas conveying device and/or the second gas conveying device may be placed inside or outside the second chamber. Overall, the installation volume of the expansion tank system may be clearly smaller than what is possible with common passive expansion tanks.

The control unit preferably receives signals from the first pressure sensor, such that the control unit is able to determine whether additional gas or a pressure reduction is required. The control unit may be continuously operated when the respective liquid cooling system is in operation, such that the pressure inside the first chamber permanently remains in a predetermined pressure interval. The control unit may be part of a superordinate control unit, such as a vehicle control unit, a fuel-cell control unit or similar. For improving the safety, it is reasonable to include a pressure release valve to one or both of the first and second chambers to avoid inadvertent overpressure when the control unit and/or one of the gas conveying devices is not operable.

In an advantageous embodiment the expansion tank further comprises a deionization filter arranged inside the first chamber. The deionization filter may be provided in form of a filter cartridge, which is placeable into and removable from the first chamber. The deionization filter may exemplarily comprise an ion exchange resin. This is a material that serves as a medium for ion exchange. It is realized as an insoluble matrix formed, for example, in the form of small microspheres of an organic polymer substrate. The microspheres are preferably porous and have a large surface area on which and in which the trapping of ions takes place together with the accompanying release of other ions.

In an advantageous embodiment, the expansion tank system further comprises an access flap at a top side of the first chamber for inserting into or removing the deionization filter from the first chamber. Coolant may remain inside the first chamber and removal of the filter is simple. As explained further below, air or other gas in the coolant, which may enter the first chamber when replacing the filter, may be separated from the coolant and may accumulate at the top side of the first chamber, where it can be fed to the second chamber.

In an advantageous embodiment, the first chamber comprises a second coolant port arranged at a side surface of the first chamber in a distance to a bottom side of the first chamber for allowing a through-flow of coolant from the second coolant port to the first coolant port. Thus, a filter arranged in the first chamber may be flown-through by the coolant, which may enter the second coolant port and flow out through the first coolant port. In particular in case a deionization filter is provided, the expansion tank system allows to maintain a continuous flow for continuously de-ionizing the coolant. Furthermore, the continuous flow allows air to separate from the coolant and to collect in the upper part of the first chamber. Thus, the coolant in the main coolant loop of the device to be cooled can be kept free or air. It is preferred that the second coolant port is arranged above a top delimitation of the deionization filter. The deionization filter may comprise a height that equals roughly half the height of the side surface, which may ensure that the filter is immersed most of the time.

In an advantageous embodiment, the first coolant port is arranged on the bottom surface. The deionization filter, another filtering element or any other additional component may be placed between the first coolant port and the second coolant port. By providing the first coolant port at the bottom side, a safe supply and return of coolant into and from the expansion tank system can be ensured.

In an advantageous embodiment, the first gas conveying device comprises a compressor. An inlet of the compressor is connected to a first gas port of the first chamber, preferably in an upper section of the first chamber, such that suctioning of coolant can be prevented. The compressor may be an electrically driven compressor and may comprise a compressor wheel connected to an electric motor. The electric motor is preferably controllable by the control unit and may be selectively operated and, optionally, controlled in speed. An outlet of the compressor is connected to a second gas port of the second chamber. A non-return valve may be arranged at the outlet of the compressor and/or at the inlet of the compressor to avoid a flow of gas from the second chamber to the first chamber through the compressor.

In an advantageous embodiment, the second gas conveying device comprises a controllable valve. At least in operation, the pressure in the second chamber clearly exceeds the pressure in the first chamber. Hence, providing a controllable valve is sufficient for conveying gas from the second chamber to the first chamber. The valve may be adapted to variably open and close, such that a mass flow through the valve can be controlled. In an alternative embodiment, the valve may simply open and close on demand to initiate or interrupt a gas flow.

In an advantageous embodiment, the gas inside the second chamber is air. As mentioned above, particularly when a continuous flow of coolant is maintained through the first chamber, air can be separated from the coolant to keep a main coolant loop free of air, wherein the air is collected in an upper part of the first chamber. The use of nitrogen in a closed pressure tank is thus not required. This may also render possible an additional function of using the first gas conveying device to increase the pressure in the second chamber without using air from the first chamber, but ambient air from the surrounding of the expansion tank system. For example, the second chamber may comprise a second pressure sensor connected to the control unit. Once a predetermined minimum pressure exceeds the actual pressure inside the second chamber, the first gas conveying device may feed ambient air into the second chamber to maintain a desired pressure interval. Thus, the size of the second chamber may even further be reduced.

In an advantageous embodiment, the first chamber and the second chamber are arranged in separate housings, wherein the first chamber and the second chamber are attached to each other. Depending on the installation conditions, the first chamber and the second chamber may be attached to each other side-by-side, bottom-on-top or in any other suitable arrangement. The expansion tank system may thus lead to different possible shapes that may be chosen to match the available space.

The disclosure herein further relates to a system having a heat producing device, a coolant loop having a heat exchanger thermally coupled with the heat producing device and an expansion tank system according to the above description, wherein the expansion tank system is connected to the coolant loop. The coolant loop may comprise an expansion tank port, to which the first coolant port of the first chamber is connected. For allowing a through-flow of coolant through the first chamber, another section of the coolant loop may be connected to the second coolant port, if available. The through-flow would commence once a pressure differential exists between the two coolant ports.

In an advantageous embodiment, the heat producing device is a fuel cell system. The expansion tank system is particularly advantageous for use in a fuel cell system. It is capable of coping with the volume change due to temperature changes, while the risk for too high pressures in the fuel cell, in particular a PEM fuel cell, is eliminated even though the expansion tank system comprises a compact shape. With the deionization filter mentioned above, the coolant may maintain a low electric conductivity of exemplarily less than 5 $\mu$s/cm.

The disclosure herein further relates to a vehicle, comprising at least one system having a heat producing device according to the above.

In an advantageous embodiment, the vehicle may be an aircraft. Here, significant changes in ambient pressure and temperatures lead to a wide range of changes in the volume of the coolant.

BRIEF DESCRIPTION OF THE DRAWINGS

In the following, the attached drawings are used to illustrate exemplary embodiments in more detail. The illustrations are schematic and not to scale. Identical reference numerals refer to identical or similar elements.

DETAILED DESCRIPTION

Figure 1:
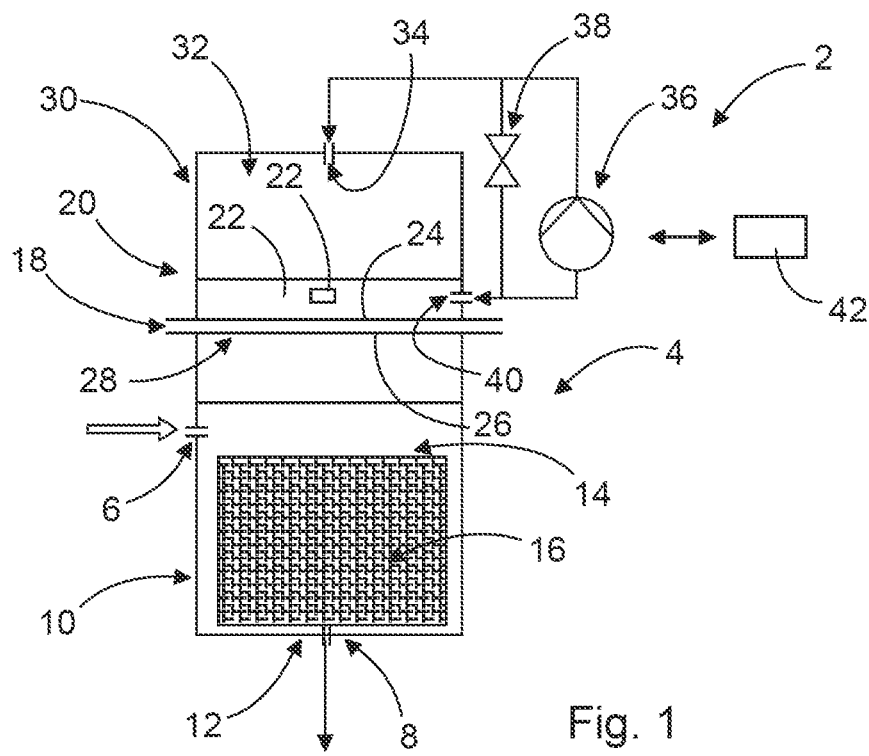
FIG. 1 shows a schematic view of an expansion tank system.

FIG. 1 shows an expansion tank system 2 in a schematic view. Here, a first chamber 4 is shown, which comprises a first coolant port 8 and a second coolant port 6. While the first coolant port 8 is arranged at a bottom side 12 of the first chamber 4, the second coolant port 6 is arranged on a side surface 10. The first chamber 4 is provided to receive excess coolant 14 from a coolant loop, to which the first chamber 4 is connected. The size of the first chamber 4 is dimensioned in such a way, that under all possible operating conditions it is sufficient temporarily storing the excess coolant 14.

A deionization filter 16 is provided in the first chamber 4, which comprises an ion exchange resin with which the conductivity of the coolant 14 is reduced. In case of a continuous flow of coolant between the second coolant port 6 and the first coolant port 8, coolant constantly flows through the deionization filter 16 to continuously maintain a low conductivity. For selectively replacing the deionization filter 16, an access flap 18 is provided at a top region 20. The access flap 18 may comprise a cover 22 having a first flange 24. A second flange 26 is provided at an upper opening of the first chamber 4 and has a shape that corresponds to the first flange 24. Flanges 24 and 26 may be releasably clamped together through bolts, while an air-tight seal (not shown) is arranged between the flanges 24 and 26.

A second chamber 30 is provided, which contains pressurized air 32. The first chamber 4 comprises a first gas port 40 at the top region 20 and the second chamber 30 comprises a second gas port 34. A first air conveying device 36 in the form of a compressor and a second air conveying device 38 in form of a valve are connected to the second gas port 34 and the first gas port 40. The air pressure inside the second chamber 30 exceeds the air pressure inside the first chamber 4. Selectively, the air pressure in the first chamber 4 may be increased by opening the valve 38 to convey air from the second chamber 30 to the first chamber 4 and it may be decreased by operating the compressor 36 to convey air from the first chamber 4 to the second chamber 30.

A control unit 42 is coupled with the first air conveying device 36, the second air conveying device 38 and a first pressure sensor 44 arranged inside the first chamber 4. The control unit 42 is capable of controlling both conveying devices 36 and 38 to maintain a predetermined pressure inside the first chamber 4 through selectively introducing or removing air from the first chamber 4.

Figure 2:
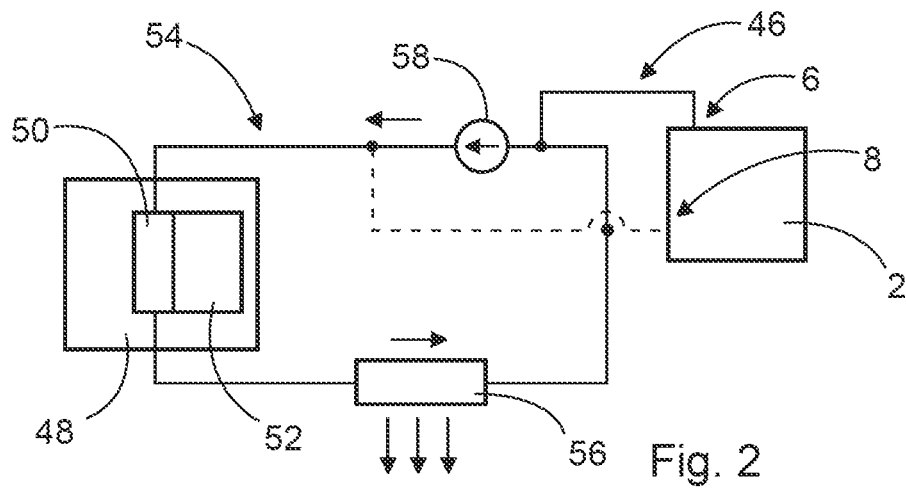
FIG. 2 shows a system having a heat producing device connected to the expansion tank system.

FIG. 2 shows a system 46 having an arrangement 48 of a heat producing device 52 and a heat exchanger 50 coupled thereto. A coolant loop 54 is connected to the heat exchanger 50. An expansion tank system 2 according to FIG. 1 is provided, which is connected to the coolant loop 54 via the first coolant port 8. The coolant loop 54 is further connected to a heat dissipation device 56, e.g. a cooler or a further heat exchanger, which disposes of heat generated by the heat producing device 52. A pump 58 is provided that conveys coolant within the coolant loop 54. The second coolant port 6 may be coupled with a section of the coolant loop 54 downstream the pump 58, such that a fraction of the coolant may continuously flow through the first chamber 4 and the deionization filter 16.

Figure 3:
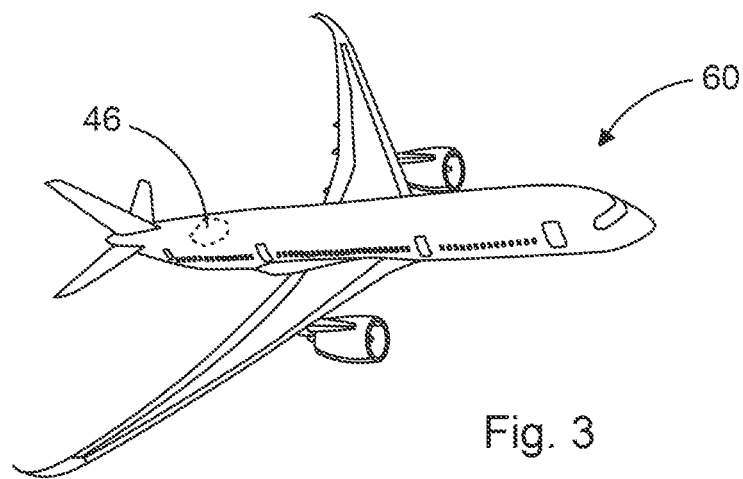
FIG. 3 shows an aircraft having a system according to FIG. 2.

Lastly, FIG. 3 shows an aircraft 60, which comprises a system 46, which is exemplarily shown with dashed lines in a rear part of the aircraft 60.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE NUMERALS 2 expansion tank system
4 first chamber
6 second coolant port
8 first coolant port
10 side surface
12 bottom side
14 coolant
16 deionization filter
18 access flap
20 top region
22 cover
24 first flange
26 second flange
28 upper opening
30 second chamber
32 pressurized air
34 second gas port
36 first gas conveying device/compressor
38 second gas conveying device/valve
40 first gas port
42 control unit
44 first pressure sensor
46 system
48 arrangement
50 heat exchanger
52 heat producing device
54 coolant loop
56 heat dissipation device
58 pump
60 aircraft

The invention claimed is:

1. An expansion tank system for a liquid cooling system, comprising:
a first chamber for receiving a coolant, the first chamber having a first coolant port;
a second chamber for storing a pressurized gas;
a first gas conveying device connected to the first chamber and the second chamber for conveying gas from the first chamber to the second chamber;
a second gas conveying device connected to the first chamber and the second chamber for conveying gas from the second chamber to the first chamber;
a first pressure sensor in fluid communication with the first chamber; and
a control unit connected to the first gas conveying device, the second gas conveying device and the first pressure sensor;
wherein the control unit is configured for controlling the second gas conveying device to selectively convey gas from the second chamber to the first chamber if a pressure measured through the first pressure sensor is below a predefined first threshold value, and for controlling the first gas conveying device to selectively convey gas from the first chamber to the second chamber if a pressure measured through the first pressure sensor is above a second threshold value.

2. The expansion tank system according to claim 1, further comprising a deionization filter inside the first chamber.

3. The expansion tank system according to claim 2, comprising an access flap at a top side of the first chamber for inserting into or removing the deionization filter from the first chamber.

4. The expansion tank system according to claim 1, wherein the first chamber comprises a second coolant port arranged at a side surface of the first chamber in a distance to a bottom side of the first chamber for allowing a through-flow of coolant from the second coolant port to the first coolant port and for separating air bubbles from the coolant.

5. The expansion tank system according to claim 4, wherein the first coolant port is on the bottom side of the first chamber.

6. The expansion tank system according to claim 1, wherein the first gas conveying device comprises a compressor.

7. The expansion tank system according to claim 1, wherein the second gas conveying device comprises a controllable valve.

8. The expansion tank system according to claim 1, wherein the gas inside the second chamber is air.

9. The expansion tank system according to claim 1,
wherein the first chamber and the second chamber are in separate housings, and
wherein the first chamber and the second chamber are attached to each other.

10. A system having a heat producing device, a coolant loop having a heat exchanger thermally coupled with the heat producing device and an expansion tank system according to claim 1, wherein the expansion tank system is connected to the coolant loop.

11. The system according to claim 10, wherein the heat producing device is a fuel cell system.

12. A vehicle comprising at least one system according to claim 10.

13. The vehicle according to claim 12, wherein the vehicle is an aircraft.

* * * * *